Patented Mar. 10, 1936

2,033,702

UNITED STATES PATENT OFFICE 2,033,702

HEAT STORAGE AND TRANSFER AGENT

John J. Grebe and Sylvia M. Stoesser, Midland, Mich., assignors to The Dow Chemical Company, Midland, Mich., a corporation of Michigan No Drawing. Application June 7, 1934, Serial No. 729,534

5 Claims. (Cl. 44—3)

This invention concerns an improved organic heat transfer agent which can be used advantageously for the storage and transfer of heat, particularly at high temperatures.

Indirect heating by means of heat stored in a body of a liquid agent is common practice. By such indirect mode of heating, as is well known, a single furnace can be used to supply heat at a multiplicity of widely separated points; heat can be delivered at each such point in the quantity and at the temperature required; accurate temperature control in heating driers, chemical reactors, etc., is rendered relatively simple; the fire hazard often involved in direct heating, for instance of chemical apparatus containing combustible material, can largely be avoided; and the excess heat generated by a furnace during periods of low demand can be stored and drawn upon during periods of high demand.

While water is the best heat transfer agent for use at moderately elevated temperatures, there are practical limitations to its use for purposes requiring higher temperatures, due chiefly to the high pressure developed, although corrosion of iron and steel apparatus also becomes a matter for concern at temperatures above about 300° C.

Consequently, a demand has arisen for a high boiling material which can be used satisfactorily as a heat storage and transfer agent at high temperatures, e. g. above 300° C., and at moderate pressures. A number of materials have been proposed to fill this demand, but only a few have met with success, most important of which are mercury, diphenyl, and diphenyl oxide. The use of mercury has been limited by various disadvantages, such as its cost, high density, low specific heat, and the toxicity of its vapors. Diphenyl and diphenyl oxide have relatively high boiling points, i. e. 255°–260° C., and are stable when heated under pressure to temperatures approaching 400° C., but at higher temperatures decomposition becomes too great to enable them to be used satisfactorily over long periods of time.

It is an object of the present invention to provide an organic material which can be used satisfactorily as a liquid heat storage and transfer agent at temperatures higher than those at which the most stable organic agents of the prior art can be used practically.

We have found that a heat storage and transfer agent fulfilling these requirements is provided in a mixture of polynuclear aromatic hydrocarbons higher than diphenyl which is formed through condensation between benzene and/or diphenyl in the manufacture of diphenyl by pyrolysis of benzene. This material is obtained as a residue after distilling off unreacted benzene and the diphenyl product from the reacted mixture.

The exact composition of such residual mixture is not known, but it contains a considerable proportion of triphenyls, tetraphenyls, etc. The composition and physical constants of the mixture vary somewhat with changes in the conditions under which it is produced, but in general it is a partially or completely solid waxy material at room temperature, but completely liquid at temperatures below 200° C. It has a specific gravity of approximately 1.1–1.2 at 20° C., a specific heat between about 0.40 and 0.60 at 200° C., and a flash point above 160° C. The mixture can be heated in the absence of air to about 650° C. before rapid carbonization occurs, and it can be heated at 500° C. for a long period of time, e. g. 6 months or longer, without undergoing carbonization or material decomposition. It can be heated at atmospheric pressure to about 350° C. before boiling occurs. It is non-corrosive to iron or steel and does not give off toxic vapors. Such residue from the diphenyl process is, accordingly, adapted to use as a heat storage and transfer agent at temperatures as high as 500° C., particularly at temperatures between 300° and 500° C. At temperatures below 350° C. it may be employed at atmospheric pressure, and at the higher temperatures only moderate pressures are developed.

By distilling the more volatile materials from the mixture described above, fractions of distillate varying in specific gravity from 1.10 to 1.25 at 20° C. and having flash points above 160° C. may be separated, and a residual mixture of polynuclear aromatic hydrocarbons having a normal boiling point above 500° C. may be obtained. Each fraction of distillate may be used as a heat storage and transfer agent under the conditions described above. The final residue from the distillation is ordinarily obtained as a black tar which is completely solid at room temperature, but which softens to a thick liquid at about 160° C. It has a specific gravity between 1.2 and 1.25 at 20° C. The mixture may be used as a heat storage and transfer agent at atmospheric pressure and temperatures as high as 500° C. and is particularly valuable for such purpose at temperatures between 400° and 500° C.

The polynuclear aromatic hydrocarbon mixtures described above, which are adapted to use as heat storage and transfer agents, each have physical characteristics falling within the following limits:—

(1) *Form.*—Partially or completely solid at room temperature.

(2) *Melting point.*—Completely melted at temperatures below 200° C.

(3) *Boiling point.*—Can be heated to at least 350° C. at atmospheric pressure before boiling occurs.

(4) *Specific gravity.*—Between 1.10 and 1.25 at 20° C.

(5) *Specific heat.*—Between 0.40 and 0.60 at 200° C.

(6) *Flash point.*—Above 160° C.

The method of using our agents is that commonly followed in using other liquid heat storage and transfer agents, i. e. the agent is heated, preferably in the absence of air, to the desired temperature, e. g., 300°–500° C., and is then brought into heat transfer relationship with a cooler body, e. g. a still, drier, etc., whereby the latter is heated.

Other modes of applying the principle of our invention may be employed instead of those explained, change being made as regards the method or composition herein disclosed, provided the steps or compositions stated by any of the following claims or the equivalent of such stated steps or compositions be employed.

We therefore particularly point out and distinctly claim as our invention:—

1. A heat storage and transfer agent consisting substantially of a mixture of polynuclear aromatic hydrocarbons produced by the pyrolysis of benzene and diphenyl and of molecular weight greater than that of diphenyl, which agent is capable of being heated to a temperature of 500° C. without undergoing appreciable carbonization.

2. A heat storage and transfer agent consisting substantially of a mixture of multinuclear aromatic hydrocarbons produced by the pyrolysis of benzene and diphenyl and of molecular weight greater than that of diphenyl, said mixture being at least partially solid at room temperature, being completely melted at 200° C., having a specific gravity between 1.10 and 1.25 at 20° C., having a flash point above 160° C., and being stable against carbonization when heated to 500° C. in the absence of air.

3. A heat storage and transfer agent consisting substantially of a mixture of polynuclear aromatic hydrocarbons produced by the pyrolysis of benzene and diphenyl and of molecular weight greater than that of diphenyl, said mixture being a black tar which softens to a thick liquid at about 160° C. and can be heated to 500° C. at atmospheric pressure without boiling, has a specific gravity between 1.20 and 1.25 at 20° C., and is stable against carbonization when heated to 500° C. in the absence of air.

4. The method of indirect heating which comprises heating the heat storage and transfer agent described in claim 1 to a temperature between about 300° and about 500° C., and thereafter bringing the heated agent into heat transfer relationship with a cooler body, whereby the latter is heated.

5. The method of indirect heating which comprises heating the heat storage and transfer agent described in claim 3 to a temperature between about 400° and about 500° C., and thereafter bringing the heated agent into heat transfer relationship with a cooler body, whereby the latter is heated.

JOHN J. GREBE.
SYLVIA M. STOESSER.